June 9, 1959 P. GWINN 2,889,891
AUXILIARY WHEEL SUPPORTS FOR VEHICLES
Filed May 17, 1957 2 Sheets-Sheet 1

INVENTOR.
Pearl Gwinn
BY
Atty.

June 9, 1959 P. GWINN 2,889,891
AUXILIARY WHEEL SUPPORTS FOR VEHICLES
Filed May 17, 1957 2 Sheets-Sheet 2
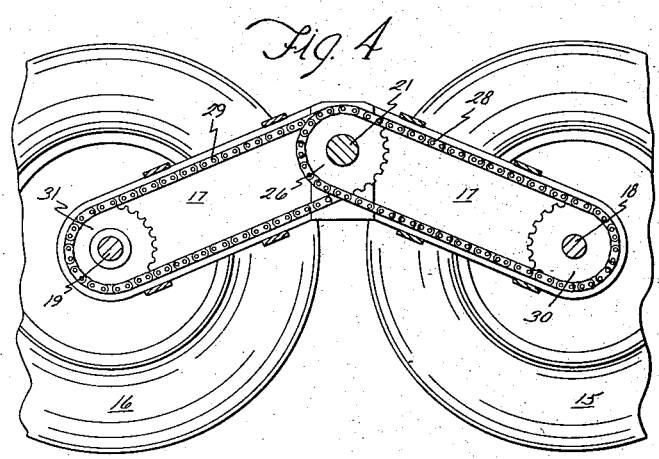
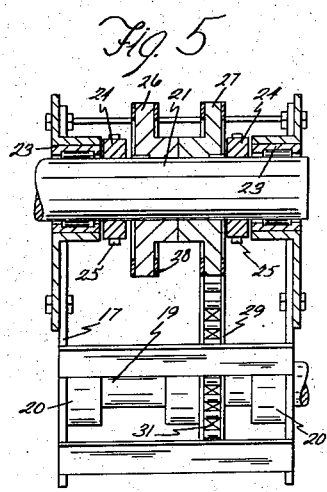
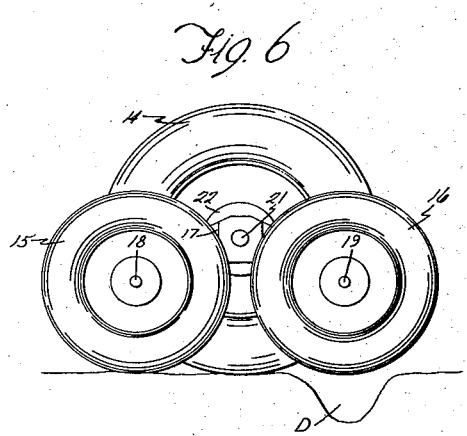
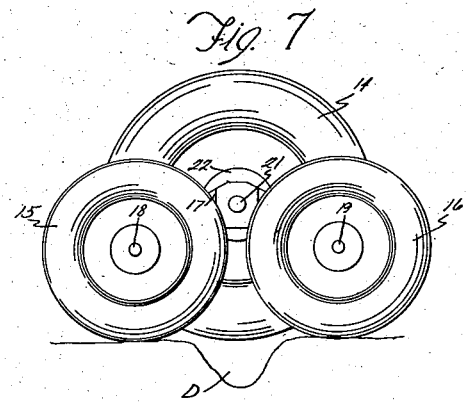
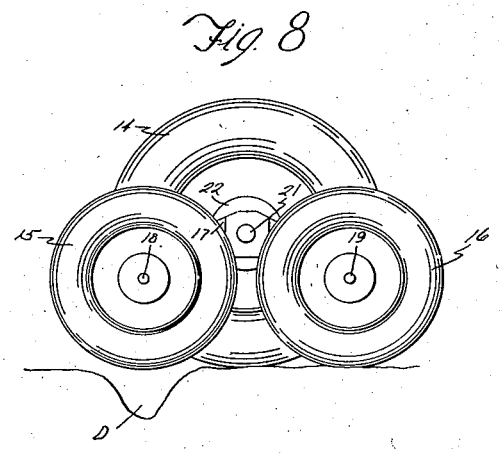
INVENTOR.
Pearl Gwinn
BY
Atty.

2,889,891

AUXILIARY WHEEL SUPPORTS FOR VEHICLES

Pearl Gwinn, Pomeroy, Wash.

Application May 17, 1957, Serial No. 659,950

3 Claims. (Cl. 180—22)

My invention relates to auxiliary wheel supports for vehicles. It is particularly directed to providing auxiliary wheels for such farm vehicles as wheeled tractors, headers, harvesters, seeders, weeders and sprayers. It is the purpose of my invention to provide an auxiliary two wheeled unit which is mounted on the axis of a supporting wheel of the vehicle and is free to turn thereon, which unit will provide support in front of and to the rear of the wheel to supplement the support of the implement by the supporting wheel in going over depressions and bumps so as to avoid the sudden vertical shocks to the implement that would otherwise result from the supporting wheel passing over such depressions or bumps.

It is also a purpose of my invention to provide an auxiliary two wheeled unit of the character above referred to wherein the two wheels of the unit are driven through the supporting wheel hub to rotate at a surface speed equal to the surface speed of the supporting wheel, thereby to furnish auxiliary traction as well as support.

The nature and advantages of my invention will appear more fully from the following description and the accompanying drawings illustrating a preferred form of the invention. It should be understood, however, that the drawings and description are illustrative only and are not intended to limit the invention except insofar as it is limited by the claims.

In the drawings:

Figure 4 is a sectional view on an enlarged scale taken on the line 4—4 of Figure 3;

Figure 5 is an enlarged sectional view taken on the line 5—5 of Figure 3; and

Figures 6, 7 and 8 are similar diagrammatic side views of a supporting wheel with the auxiliary two wheeled unit attached, showing how the assembly passes over washouts.

Figure 1:
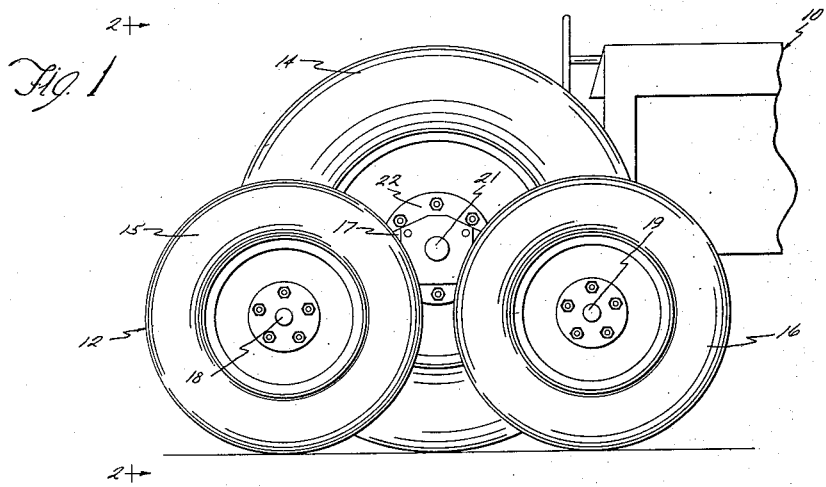
Figure 1 is a partial view in side elevation of a farm vehicle showing my invention applied to a supporting wheel of the vehicle.
Figure 2:
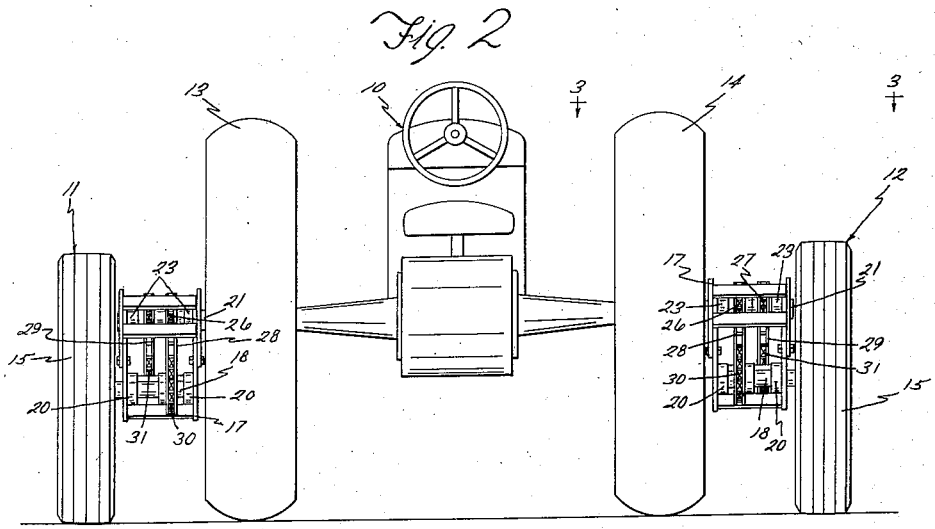
Figure 2 is an elevational view looking at Figure 1 from the line 2—2.
Figure 3:
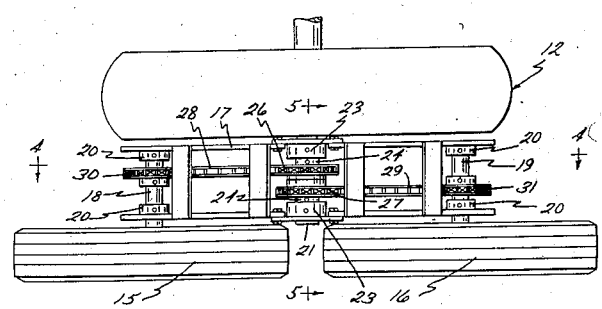
Figure 3 is a fragmentary plan view taken on the line 3—3 of Figure 2.

Referring now in detail to the drawings, my invention is shown as attached to a wheeled vehicle such as a farm tractor 10. Two auxiliary, two wheeled units 11 and 12 are attached to the large rear wheels 13 and 14 of the farm tractor 10. Each unit 11 or 12 comprises two wheels 15 and 16, and a frame 17 in which shafts 18 and 19, fixed to the wheels 15 and 16 respectively, are mounted by bearings 20. The unit also comprises a main shaft 21 which is fixed on each of the supporting wheels 13 and 14 at its axis so as to rotate with the supporting wheel. Any suitable method of securing the stub shaft 21 to the hub 22 of the supporting wheel 13 or 14 may be used.

The shaft 21 serves as the sole means of transmitting load between frame 17 and the supporting wheel hub 22 and also rotatably mounts the frame 17. The mounting of the shaft 21 to the hub 22 must therefore be substantial. Two bearings 23 fixed to the frame 18 and journalled on the shaft 21, provide the rotatable mounting of the frame 17 on the shaft 21 which is centered on the axis of the supporting wheel 13—14. Two collars 24 are shown fixed on the shaft 21 by pins 25 to keep the frame 17 from moving endwise on the shaft 21.

With the construction just described, the frame 17 is journalled at its midpoint on the shaft 21 and the wheels 15 and 16 are journalled in the frame 17 at its ends. The shaft 21 rotates with the corresponding supporting wheel 13 or 14 on which it is fixed, and the bearings 23 are therefore good roller bearings that can withstand the continuous rotation. Like bearings 20 are provided for journalling the shafts 18 and 19 in the ends of the frame 17.

When the auxiliary units 11 and 12 are used, as in the drawings, upon a power driven wheel, it is advantageous to be able to transmit power to the wheels 15 and 16 from the wheel 13 or 14 to take advantage of the added surfaces the wheels 15 and 16 have in contact with the ground. The shaft 21 is shown connected to the shafts 18 and 19. Two sprocket wheels 26 and 27 are fixed on the shaft 21. The sprocket wheel 26 is connected by a sprocket chain 28 to a sprocket wheel 30 fixed on the shaft 18. The sprocket wheel 27 is connected by a sprocket chain 29 to a sprocket wheel 31 fixed on the shaft 19. The respective sizes of the sprocket wheels 26 and 30 and 27 and 31 are chosen so that the surface speed of rotation of the wheels 15 and 16 will be the same as the surface speed of the main wheel 13 or 14 to which the auxiliary two wheeled unit is attached.

This auxiliary two wheeled unit attachment has been particularly useful where the vehicle wheel to which it is mounted must travel over washed ground that is often encountered in fields where crops are raised. In Figures 6 to 9 I have illustrated diagrammatically how the auxiliary two wheel units cooperate with the supporting wheel 14. Figure 6 illustrates how the front wheel of the two wheel unit carries over a small washout D when the wheel 14 is approaching the washout. The wheels 15 and 16 are spaced axially from the wheel 14 by the frame 17 so they are not touching the track made by the wheel 14. When the wheel 14 reaches the depression D the wheel 16 is across the depression and the wheel 15 has not reached it so the load is taken by those two wheels until the main supporting wheel again reaches solid ground in the position shown in Figure 8.

It is believed that the nature and advantages of my invention will be understood from the foregoing description. It provides a simple device which can be mounted direct to a vehicle wheel by a stub shaft or extension of the wheel shaft and that will act to cushion the sharp vertical drops of the supporting wheel as well as to supply additional surface to engage the ground. This added surface is very much needed at certain times in farm vehicles. When powered, the auxiliary two wheeled unit provides traction even though the main supporting wheel may be off the ground. It keeps the supporting wheels from digging themselves deeper in a rut or trench.

Having described my invention, I claim:

1. In a wheeled vehicle, the combination with a supporting wheel of said vehicle, of an auxiliary wheel attachment comprising a shaft fixedly mounted upon the supporting wheel coincident with the axle thereof and extending axially therefrom, a fore and aft elongated frame freely pivoted on said shaft, stub shafts mounted at each end of said frame, and an auxiliary vehicle supporting wheel mounted upon each of said stub shafts, said auxiliary supporting wheels being spaced laterally from the first named wheel and being operable to provide auxiliary support for the first named wheel and the load of the vehicle.

2. The invention defined in claim 1 wherein the fore and aft elongated frame is pivoted to the shaft at the midpoint of the frame.

3. In a wheeled vehicle, the combination with a supporting wheel of said vehicle, of an auxiliary wheel attachment comprising a shaft fixedly mounted upon the supporting wheel coincident with the axle thereof and extending axially therefrom, a fore and aft elongated frame freely pivoted on said shaft, stub shafts mounted at each end of said frame, an auxiliary vehicle supporting wheel mounted upon each of said stub shafts, said auxiliary supporting wheels being spaced laterally from the first named wheel and being operable to provide auxiliary support for the first named wheel and the load of the vehicle, and drive means drivingly connecting said auxiliary supporting wheels to the first named shaft operable to rotate said auxiliary supporting wheels at a surface speed equal to the first named wheel.

References Cited in the file of this patent

UNITED STATES PATENTS

| 1,812,875 | Henneuse | July 7, 1931 |
| 1,984,072 | Masury et al. | Dec. 11, 1934 |
| 2,461,850 | Slemmons | Feb. 15, 1949 |

FOREIGN PATENTS

| 459,135 | Germany | Apr. 26, 1928 |
| 627,092 | Germany | Mar. 7, 1936 |
| 323,366 | Great Britain | Jan. 2, 1930 |